(12) United States Patent
Cox (10) Patent No.: US 9,147,295 B2
(45) Date of Patent: Sep. 29, 2015

(54) INDUCTIVE COUPLING ACTIVATION SYSTEMS AND METHODS

(71) Applicant: X-Card Holdings, LLC, West Chester, PA (US)

(72) Inventor: Mark A. Cox, West Chester, PA (US)

(73) Assignee: X-CARD HOLDINGS, LLC, West Chester, PA (US)

( * ) Notice: Subject to any disclaimer, the term of this patent is extended or adjusted under 35 U.S.C. 154(b) by 0 days.

(21) Appl. No.: 14/312,254

(22) Filed: Jun. 23, 2014

(65) Prior Publication Data

US 2014/0374489 A1    Dec. 25, 2014

Related U.S. Application Data

(60) Provisional application No. 61/837,910, filed on Jun. 21, 2013.

(51) Int. Cl.
| | |
|---|---|
| *G06K 19/06* | (2006.01) |
| *G07C 9/00* | (2006.01) |
| *G06K 19/07* | (2006.01) |
| *G06K 19/073* | (2006.01) |

(52) U.S. Cl.
CPC ...... *G07C 9/00111* (2013.01); *G06K 19/06196* (2013.01); *G06K 19/073* (2013.01); *G06K 19/0712* (2013.01)

(58) Field of Classification Search
CPC . G06K 19/07749; G06K 7/084; G06K 7/087; G06K 7/088; G06K 7/0008; G07F 7/1008; G06Q 20/341; G06F 3/1454
USPC ................... 235/492, 380, 449, 450, 451
See application file for complete search history.

(56) References Cited

U.S. PATENT DOCUMENTS

| | | |
|---|---|---|
| 2006/0227523 A1 | 10/2006 | Pennaz et al. |
| 2007/0277044 A1 | 11/2007 | Graf et al. |
| 2008/0296367 A1 | 12/2008 | Parkinson |
| 2009/0199004 A1 | 8/2009 | Krawczewicz et al. |
| 2009/0277968 A1 | 11/2009 | Walker |
| 2010/0140358 A1 | 6/2010 | Couck |
| 2014/0263624 A1* | 9/2014 | Guillaud ................ 235/380 |

\* cited by examiner

*Primary Examiner* — Karl D Frech
(74) *Attorney, Agent, or Firm* — Duane Morris LLP (57) ABSTRACT

Various electronic credentials comprising swipe activation are disclosed. An electronic credential core comprises a controller and an inductive coupling circuit. The inductive coupling circuit is configured to generate a signal when exposed to a changing electromagnetic field, such as during a read operation of the electronic credential by a magnetic reader. The generated signal is provided to the controller. The controller performs one or more functions in response to the generated signal. Swipe-activation of electronic credentials eliminates the need for hardware activation and increases the ease of use of the electronic credential.

22 Claims, 11 Drawing Sheets

INDUCTIVE COUPLING ACTIVATION SYSTEMS AND METHODS

CROSS-REFERENCE TO RELATED APPLICATIONS

This application claims the benefit of U.S. Provisional Patent Appl. No. 61/837,910, filed on Jun. 21, 2013, entitled "INDUCTIVE COUPLING ACTIVATION OF CHIP FOR A POWERED CARD OR ELECTRONIC DEVICE," the entirety of which is incorporated by reference herein.

This application is related to U.S. patent application Ser. No. 14/312,220, entitled "ELECTRONIC CREDENTIAL SIGNAL ACTIVATION SYSTEMS AND METHODS," filed concurrently herewith, and which is incorporated by reference herein.

FIELD OF THE INVENTION

This disclosure generally relates to systems and methods of inductive circuit activation. More particularly, this disclosure relates to systems and methods for inductive activation of powered smart cards.

BACKGROUND

In the production and design of electronic credit cards (Smart Cards) or other powered credentials (such as, for example, passports, gift cards, identification cards, etc.), emphasis is placed on conserving battery power in order to prolong the life of the electronic credential. Power consumption of the battery has traditionally been conserved by limiting functionality and utilizing just-in-time manufacturing practices to reduce the amount of time an electronic card sits in inventory and depleting battery life.

In current manufacturing processes, when the circuit of the electronic card is assembled, the circuit begins consuming power from an onboard battery immediately. For example, in cards including capacitive buttons, the circuit continuously monitors for a capacitive change in the button. To monitor for a capacitive change, an integrated circuit (IC) generates a voltage signal to determine the capacitance at the button. If there is large enough change in capacitance, the card activates one or more additional functions. The IC continuously polls the button to identify capacitive changes. Polling may occur every 1-2 seconds, depleting power from the battery when the card is in storage and/or transit. In some cases, the capacitive button is activated during storage or transportation causing larger power drain. In current manufacturing processes, as soon as the battery is connected to the circuit, the circuit begins to draw power from the battery.

Activation of powered cards is normally performed by a mechanical switch or a capacitive sense switch. The switch may be pressed to generate a connection allowing power to activate one or more card functions. The switch must be pressed by a user to activate the card. Pushing a button may be difficult for the user, for example, due to resistive force, advanced age of a user, physical ailment preventing operation of the button, etc. Capacitive sense buttons do not provide the reliability needed for some activations and use a large amount of power over the life of the card, limiting the cards use for other applications.

SUMMARY

In various embodiments, a circuit is disclosed. The circuit comprises an inductive coupler configured to generate a signal in response to an electromagnetic field and a controller coupled to the inductive coupler. The controller is configured to receive the signal. The controller executes one or more predetermined functions in response to the signal.

In various embodiments, a method for swipe activation is disclosed. In a first step, an inductive coupler is exposed to an electromagnetic field. In a second step, a signal is generated by the inductive coupler in response to the electromagnetic field. In a third step, the signal is provided to a controller. In a fourth step, the controller executes one or more predetermined functions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The present disclosure generally provides electronic credentials, such as electronic credit cards, smart cards, electronic passports, and/or other electronic credentials, that maintain an off mode, or sleep mode, until the electronic credential has been processed into a personalized singulated credential. In some embodiments, the electronic credential comprises an antenna to harvest power from a signal. The harvested power activates one or more components of the electronic credential, such as, for example, a controller. When exposed to a predetermined signal, such as a signal of a specific power, the controller executes one or more operations. The electronic credential card maintains an active mode until an onboard battery is depleted.

The present disclosure further provides electronic credentials configured for swipe-activation. In some embodiments, an electronic credential comprises an inductive coupling unit configured to generate a signal in response to an electromagnetic field. The inductive coupling unit may comprise, for example, a plurality of inductive coils. The signal generated by the inductive coupling unit is provided to a controller. The controller performs one or more functions when a voltage of the generated signal exceeds a predetermined threshold. The controller may transition to an off state after performing the one or more functions.

Figure 1:
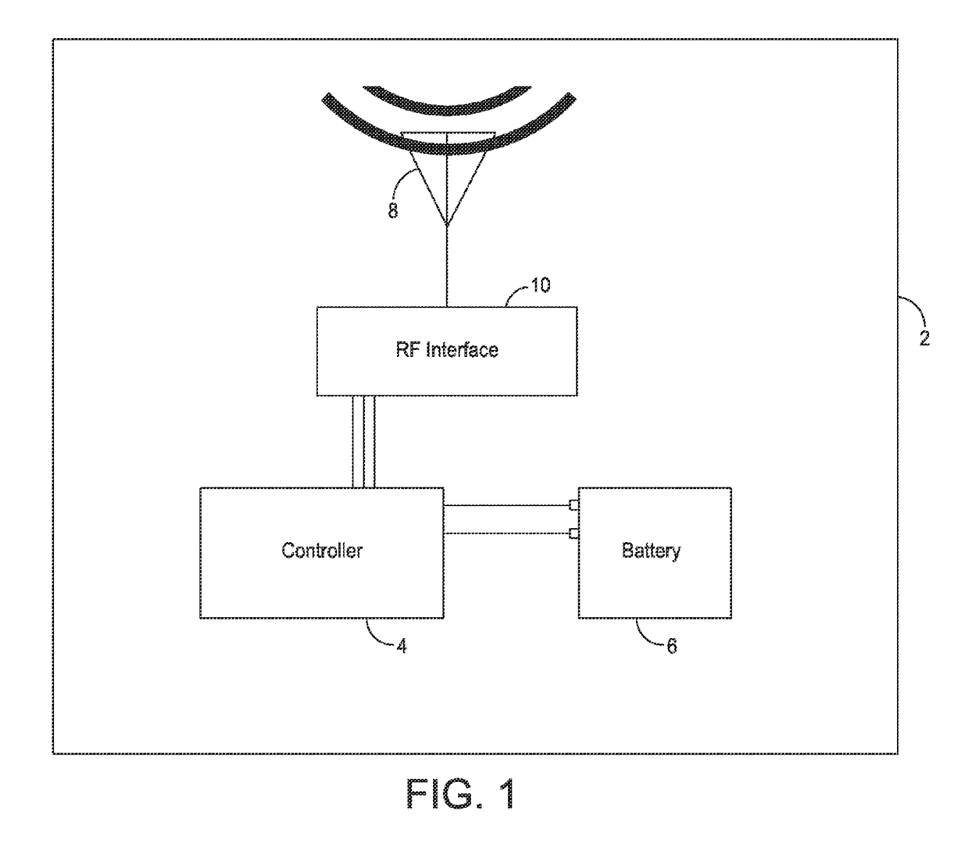
FIG. 1 illustrates a block diagram of one embodiment of an electronic credential core configured for signal activation.

FIG. 1 illustrates a block diagram of one embodiment of an electronic credential core 2 configured for signal activation. The electronic credential core 2 comprises a controller 4 configured to perform one or more functions. One or more functions of the controller 4 may correspond to components and/or uses of the electronic credential core. For example, in some embodiments, the controller 4 is configured to monitor a button (see FIG. 3), generate a one-time-passcode (OTP), display information to a user, and/or perform any other suitable function. The controller 4 is coupled to a battery 6. In some embodiments, the battery 6 is omitted. Prior to activation, the controller 4 maintains an off state, in which the controller 4 does not draw power from the battery 6. The controller 4 is configured to be activated by a signal, such as, for example, a wireless signal. The controller 4 may comprise any suitable controller, such as, for example, a microprocessor, a microcontroller, a programmable gate array, and/or any other suitable circuit or combination thereof.

The electronic credential core 2 comprises an antenna 8 configured to receive a first signal. The antenna 8 may be configured to receive any suitable signal, such as, for example, an electromagnetic signal such as a radiofrequency (RF) signal, a microwave signal, an optical signal, and/or any other suitable signal. In the illustrated embodiment, the antenna 8 is configured to receive an RF signal. The first signal is provided to a signal interface 10. The interface 10 generates a second signal in response to the first signal. The second signal comprises an activation signal for the controller 4. For example, in some embodiments, the interface 10 harvests the energy in the first signal and generates the second signal comprising a voltage corresponding to the harvested energy. The second signal is generated solely from the harvested energy and the signal interface 10 does not draw any power from the battery 6. In some embodiments, the signal interface 10 and/or additional circuit elements are configured to compare the first signal to one or more threshold values and generate the second signal when the first signal exceeds the one or more threshold values. The interface 10 provides the second signal to the controller 4. In some embodiments the controller 4 executes one or more predetermined functions when the voltage of the second signal exceeds a predetermined threshold, such as, for example, 0.5V.

In some embodiments, when the controller 4 receives the second signal, the controller 4 transitions to an active mode. The controller 4 performs one or more functions that require the controller draw power from the battery 6. For example, in some embodiments, after being activated, the controller 4 monitors one or more buttons, such as a capacitive sense switch. By maintaining the controller 4 in an off, or no-power state during storage and transportation, the electronic credential core 2 can be produced and stored without draining the battery 6, extending the shelf life and/or operational life. The electronic credential core 2 can be activated after an electronic credential has been fully manufactured.

In some embodiments, when the controller 4 receives the second signal, the controller 4 temporarily transitions to active mode. The controller 4 performs the one or more functions, such as, for example, generating an OTP code or illuminating a display, and transitions back to the off state after performing the one or more functions. The controller 4 only draws power from the battery 6 during performance of the one or more functions and then returns to the off state. In some embodiments, a secondary power source (not shown) is coupled to the controller 4 and/or the interface 10 to power one or more operations of the controller 4 without drawing power from the battery 6. The secondary power source may comprise, for example, a secondary battery, a coin cell, an Enerchip, a capacitor, and/or any other suitable power source.

Figure 2:
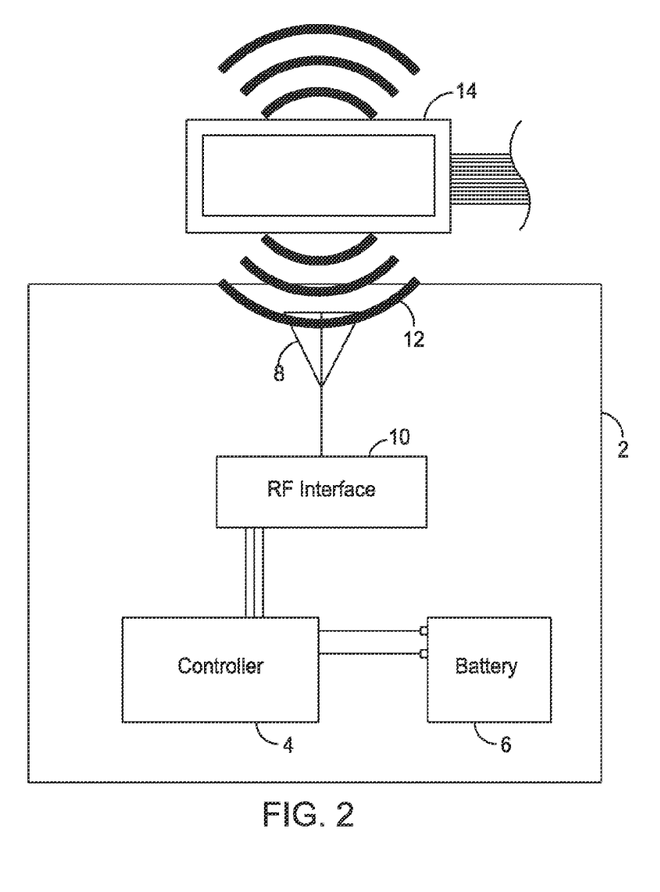
FIG. 2 illustrates one embodiments of a system for activating an electronic credential core through signal activation.

FIG. 2 illustrates a system for activating an electronic credential core 2 configured for signal activation. The electronic credential core 2 can be produced and stored with zero power use until activated. The electronic credential core 2 is activated when exposed to a signal 12. During activation, a signal 12 is generated by device 14. The signal 12 is received by the antenna 8. The interface 10 harvests the energy in the received signal and provides a voltage to the controller 4. In some embodiments, the signal 12 comprises personalization information for programming the electronic credential core 2.

In some embodiments, the signal interface 10 comprises a power convertor to harvest the energy in the first signal 12 and provide a second signal to an I/O pin of the controller 4. The second signal is generated by the signal interface 10 without drawing power from the battery 6. The controller 4 is activated by, for example, a signal having a voltage greater than or equal to a predetermined threshold. After receiving the second signal, the controller 4 transitions to an active mode and continuously draws power from the battery 6. The controller 4 performs one or more functions, such as, for example, continuously monitoring a capacitive sense switch and/or generating an OTP code in response to activation of the capacitive sense switch. In some embodiments, the controller 4 maintains an active mode until the battery 6 is depleted. In other embodiments, the controller 4 transitions to a lower power sleep mode after performing the one or more functions.

For example, in some embodiments, an electronic credential core 2 may comprise a controller 4 configured to generate one-time-passcodes (OTP). A capacitive switch (not shown) may be coupled to the controller 4. Prior to activation, the controller 4 maintains an off-state in which the controller 4 draws zero power from a battery 6 and does not monitor the capacitive switch. When exposed to a predetermined signal, the controller 4 is activated by a signal interface 10. Once activated, the controller 4 continuously monitors the capacitive switch. When the switch is pressed, for example, by a user, the controller 4 generates an OTP code for display to a user or other use (e.g., transmission) in a transaction.

In some embodiments, the first signal 12 contains personalization information. The first signal 12 is received by the interface 10 and provided to the controller 4. The personalization information may be provided by, for example, one or more demodulators and/or signal converters in the interface 10. The personalization information may comprise, for example, a credential (or card) number, a user name, an OTP algorithm, and OTP seed value, and/or additional personalization information. In some embodiments, the signal 12 comprises an RF signal, such as, for example, a signal in the range of 13.56 MHz. The personalization information may be stored by the controller 4, for example, in persistent memory. The persistent memory may be integral with the controller 4 and/or external from the controller 4. In some embodiments, the first signal 12 comprises an RF signal such as, for example, an RFID signal. In some embodiments, the first signal 12 is generated by a contactless smart card device. In other embodiments that do not use an RF activation signal, the signal can be provided through mating contact smart card pads.

Figure 3:
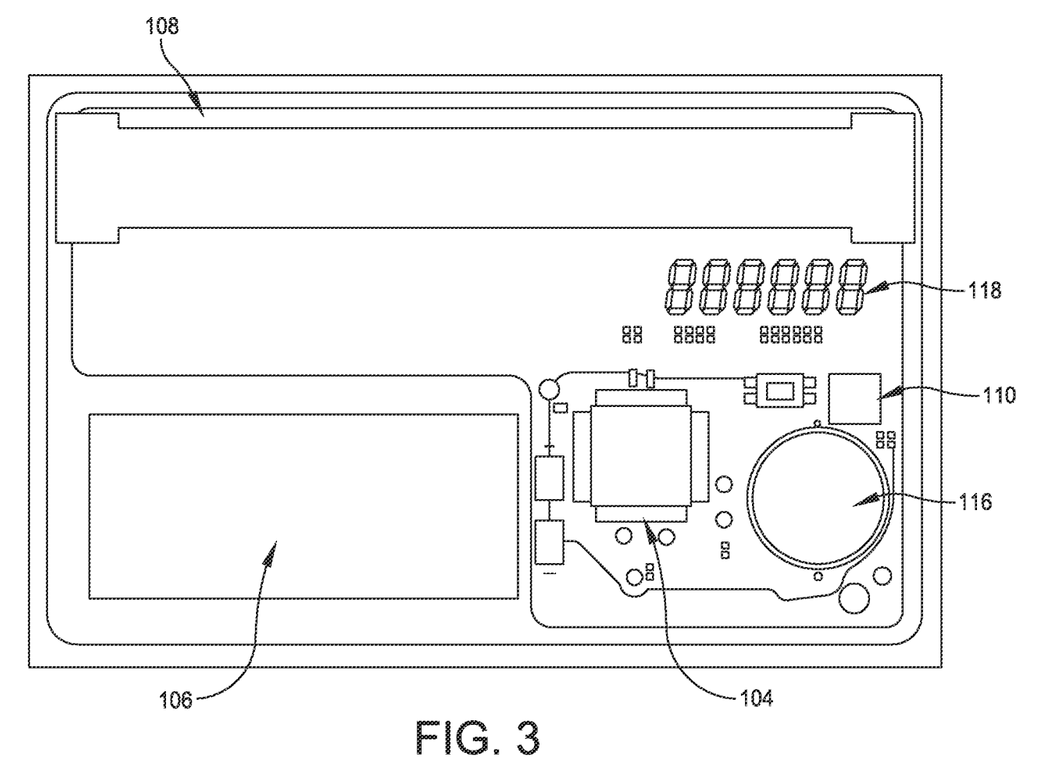
FIG. 3 illustrates one embodiment of an electronic credit card comprising a circuit configured for signal activation.

FIG. 3 illustrates an electronic transaction card, such as a credit card 100, comprising a circuit. The electronic credit card 100 comprises a controller 104 configured to perform one or more functions. The controller 104 is coupled to a battery 106. The controller 104 maintains an off, or sleep, mode until the controller 104 is activated. In the off mode, the controller 104 does not draw power from the battery 106. The electronic credit card 100 comprises an antenna 108 configured to receive a first signal, such as, for example, an RF signal. The antenna 108 is coupled to a signal interface 110. The signal interface 110 harvests the energy in the received signal and generates a second signal. The second signal is generated solely from the harvested energy and the signal interface 110 does not draw power from the battery 106. The second signal is provided to the controller 104. In some embodiments, the second signal comprises a voltage corresponding to the energy harvested from the received signal. The interface 110 comprises any suitable power conversion circuit, such as, for example, one or more inductive coils, photovoltaics, piezoelectrics, antennas, and/or any other suitable power convertor. In some embodiments, the controller 104 requires a signal having a predetermined voltage to activate the controller 104. For example, in some embodiments, the controller 104 is activated when the second signal comprises a voltage exceeding a predetermine threshold of 0.5V.

After receiving the second signal, the controller 104 transitions to an active mode in which the controller 104 draws power from the battery 106. For example, in some embodiments, the controller 104 draws power while monitoring a button 116. When the button 116 is pressed, the controller 104 generates a one-time-passcode (OTP) and displays the OTP to a user by, for example, a 6-digit, 7-segment display 118 embedded in the electronic credit card 100. In some embodiments, after receiving the activation signal, the controller 104 performs one or more predetermined operations and returns to the off-state. In some embodiments, the electronic credit card 100 comprises a swipe-activation circuit, such as a magnetic swipe strip programmed with static data or a magnetic stripe emulator that can be dynamically programmed with data and emulates a standard magnetic swipe stripe.

The electronic credit card 100 may be manufactured from an electronic pre-laminate core (or Core PreLam), such as, for example, the electronic credential core 2 illustrated in FIG. 1. A method for manufacturing an electronic credential, such as the electronic credit card 100, may comprise: assembling an electronic core circuit, such as, for example, the electronic credential core 2; placing the electronic core circuit between PVC sheets to create an electronic core; storing and/or shipping the electronic core; embedding the electronic core between one or more additional sheets of plastic comprising logos, identifiers, circuitry, etc.; forming the electronic core and one or more additional sheets of plastic into a predetermined size; personalizing the credential with customer information; and shipping the electronic credential to a customer. U.S. patent application Ser. No. 13/801,677, entitled "INFORMATION CARRYING CARD COMPRISING CROSSLINKED POLYMER COMPOSITION, AND METHOD OF MAKING THE SAME," filed on Mar. 13, 2013, is hereby incorporated by reference in its entirety. The electronic credit card 100 may be manufactured utilizing hot and/or cold lamination processes. For example, in one embodiment, a hot lamination process comprises temperatures of up to 180 degrees Celsius and a pressure of about 125-400 lbs. per square inch for durations of up to thirty minutes. In some embodiments, manufacture of an electronic credit card 100 comprises exposure of a Core PreLam to vacuum and/or pressurization conditions. The electronic credit card 100 is configured to withstand the manufacturing conditions of the electronic credit card 100.

Figure 4:
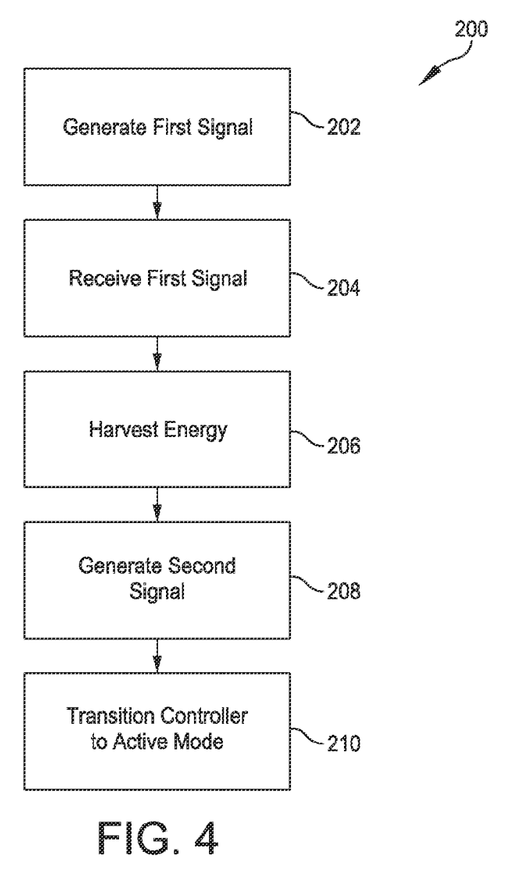
FIG. 4 is a flowchart illustrating one embodiment of a process for activating an electronic credential core.

FIG. 4 is a flowchart illustrating one embodiment of a method of activating an electronic credential. In a first step 202, a first signal is generated by an activation device. The signal may comprise any suitable signal, such as, for example, an RF signal. The signal may comprise personalization information. In a second step 204, the first signal is received by an antenna. In a third step 206, energy in the first signal is harvested by a signal interface 10. In a fourth step 208, the interface 10 generates a second signal from the harvested energy. In some embodiments, the second signal comprises a voltage corresponding to the harvested energy of the first signal. The second signal is configured to activate a controller. In some embodiments, the second signal is configured to program the controller with personalization information received from the first signal. In a fifth step 210, the controller performs one or more functions. In some embodiments, the controller performs the one or more functions until an onboard battery is depleted.

Figure 5:
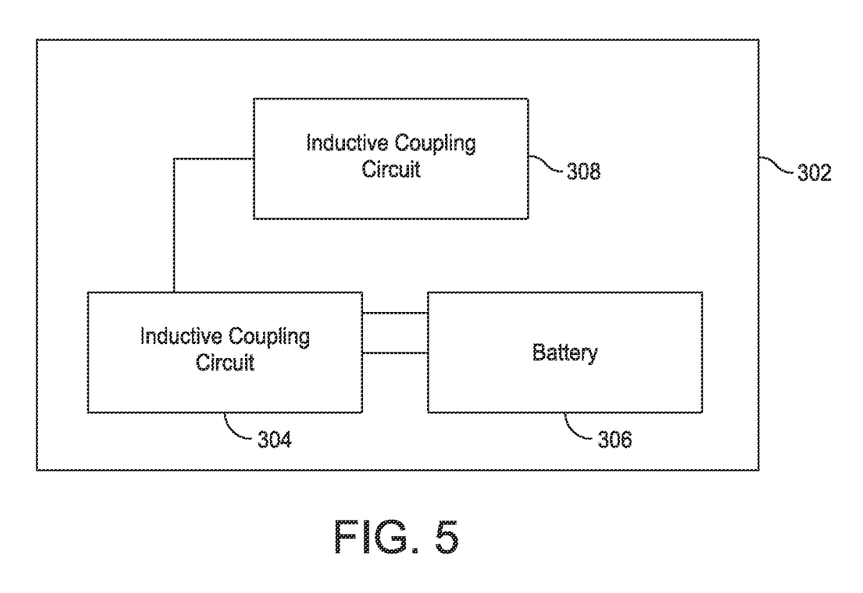
FIG. 5 illustrates a block diagram of one embodiment of an electronic credential core configured for swipe-activation.

FIG. 5 illustrates a block diagram of an electronic credential core 302 comprising a controller 304 configured for swipe-activation. The controller 304 is configured to perform one or more functions. For example, in some embodiments, the controller 4 is configured to generate and display an OTP when activated. The controller 304 may be activated by, for example, exposing the electronic credential core 302 to an electromagnetic field. The electromagnetic field may be generated by, for example, a card reader such as a magnetic card reader and/or an RFID card reader. The controller 304 may be coupled to a battery 306 to power the one or more functions of the controller 304.

The electronic credential core 302 comprises an inductive coupling circuit 308 coupled to the controller 304. The inductive coupling circuit 308 inductively couples the electronic credential core 302 to an electromagnetic field. The inductive coupling circuit 308 may comprise any suitable inductive coupling, such as, for example, an antenna, one or more inductive coils, and/or any other suitable inductive coupling device. When the inductive coupling circuit 308 is exposed to an electromagnetic field, the inductive coupling circuit 308 generates a voltage. The voltage may be provided to the controller 304 through one or more input/output (I/O) pins.

The controller 304 performs one or more predetermined functions in response to a generated voltage from the inductive coupling circuit 308. For example, in some embodiments, the controller 304 generates an OTP when the voltage generated by the inductive coupling circuit 308 exceeds a predetermined threshold. The activation of one or more predetermined functions by the inductive coupling circuit 308 is referred to as swipe-activation. The inductive coupling circuit 308 may be activated by, for example, moving or swiping the electronic credential core 302 through a magnetic field, such as a magnetic card reader, exposing the electronic credential core 302 to a contactless reader, and/or otherwise exposing the inductive coupling circuit 308 to an electromagnetic signal. Although the term "swipe-activation" is used herein, it will be recognized that any movement of the electronic credential core 302 may be sufficient to activate the inductive coupling circuit 308. In some embodiments, the electronic credential core 302 may be exposed to a changing electromagnetic field and movement of the electronic credential core 302 may not be necessary to activate the inductive coupling circuit 308.

In some embodiments, the battery 306 is omitted and the controller 304 is powered solely by the inductive coupling circuit 308. The controller 304 is coupled to the inductive coupling circuit 308. When the inductive coupling circuit 308 is exposed to an electromagnetic field, the inductive coupling circuit 308 generates sufficient energy to power the controller 304 to perform one or more predetermined functions. For example, the inductive coupling circuit 308 may be configured to generate a voltage sufficient to enable the controller 304 to generate and display an OTP code to a user. In some embodiments, the controller 304 is coupled to a battery. The inductive coupling circuit 308 activates the controller 304, which draws power from the battery 306 to perform one or more functions. The battery 306 may be configured to power a first set of functions and the inductive coupling circuit 308 may be configured to power a second set of functions of the electronic credential core 302. The battery 306 may comprise a rechargeable battery. For example, the battery 306 may be coupled to the inductive coupling circuit 308. When the inductive coupling circuit 308 is exposed to an electromagnetic field, the generated voltage is provided to the battery 306 for recharging.

Figure 10:
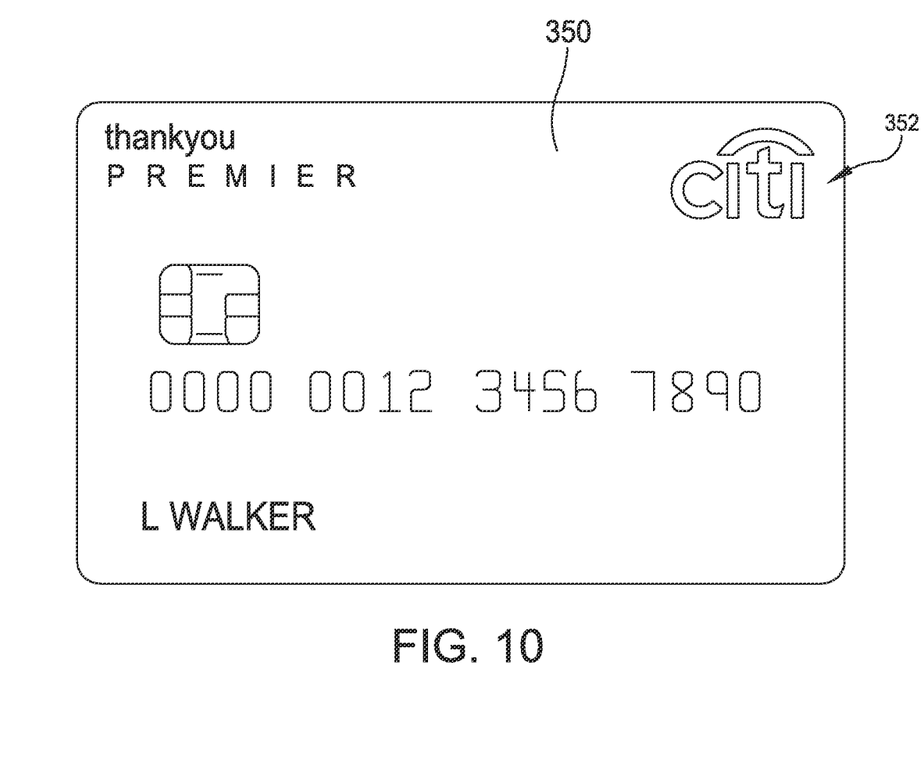
FIG. 10 illustrates one embodiment of an electronic credit card.

In some embodiments, electronic credential core 302 provides personalization and programming of the controller 304 without activation of the battery 306. The inductive coupling circuit 308 receives one or more signals comprising personalization information. The personalization information may comprise, for example, a credential (or card) number, personal identification information, transaction information, and/or any other suitable personalization information. When exposed to an electromagnetic field, the inductive coupling circuit 308 may activate the controller 304, program the controller 304, and transition the controller 304 back to an off-state to prevent the use of the battery 306. In some embodiments, the controller 304 is programmed by the inductive coupling circuit 308 and remains in an off-state until permanently activated by an activation button coupled to the controller 304 (now shown), for example, an activation signal received by an antenna The inductive coupling circuit 308 allows for the elimination of buttons from electronic credentials. When the electronic credential core 302 is exposed to an electromagnetic field, the inductive coupling circuit 308 automatically activates one or more functions of the controller 304, eliminating the need for a user-initiated action, such as pressing a button. Activating functions through inductive coupling using the power of an existing electromagnetic field, such as the magnetic field generated by a magnetic card reader, provides advantages for ease of use and power consumption. By eliminating the need for activation buttons, power loss due to monitoring of one or more buttons can be eliminated, increasing the useable life of a powered credential. Swipe-activation further provides for additional functionality and use cases for credential issuers to respond to and/or interact with a user when an electronic credential is used, for example, at a point-of-sale terminal. For example, in some embodiments, an electronic credential may comprise a logo. The logo comprises one or more LEDS and/or other suitable light source. When the electronic credential is exposed to a changing magnetic field, such as, for example, being swiped at a point-of-sale terminal, the LED is activated to illuminate the logo. In some embodiments, an electronic credential comprises a display. The display is activated by the inductive coupling circuit 308 to display one or more messages, such as, for example, "Thank You" after the electronic credential has been used at a point-of-sale terminal. FIG. 10 illustrates one embodiment of an electrical credit card 350 comprising a swipe-activated logo, insignia and/or art work 352. The swipe-activated logo 352 comprises an illumination source. The illumination source may comprise any suitable illumination source such as, for example, a light-emitting diode (LED), a light-emitting electrochemical cell (LEC), an electroluminescent wire, and/or any other suitable illumination source. The illumination source is coupled to an inductive coupling circuit, such as, for example, the inductive coupling circuit 308 illustrated in FIG. 5. When the electronic credit card 350 is read through a wireless reader, such as a magnetic stripe reader or an RFID reader, the inductive coupling circuit 308 generates a voltage for the illumination source which illuminates the swipe-activated logo 352. In some embodiments, the electronic credit card 350 comprises a swipe-activated display.

Figure 6A:
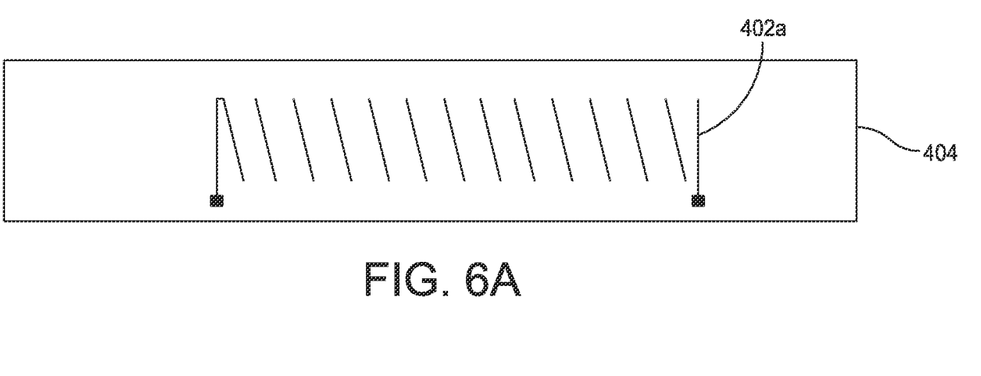
FIGS. 6A-6D illustrate one embodiment of a printed inductive coil.
Figure 6B:
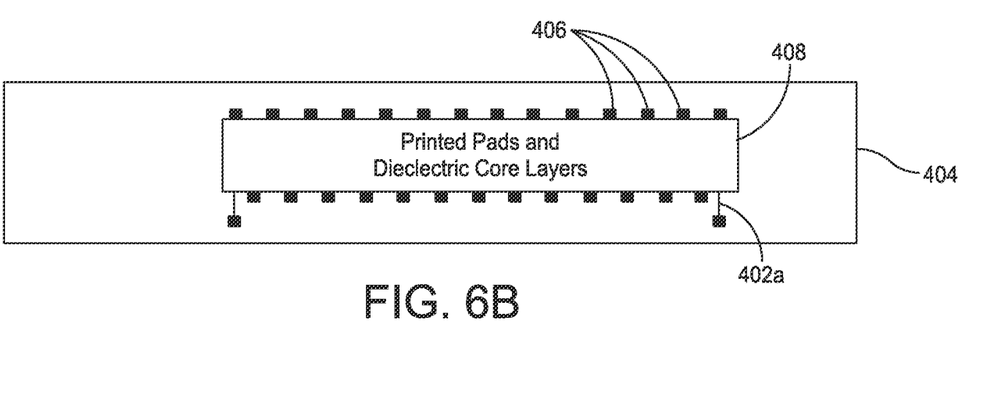
Figure 6C:
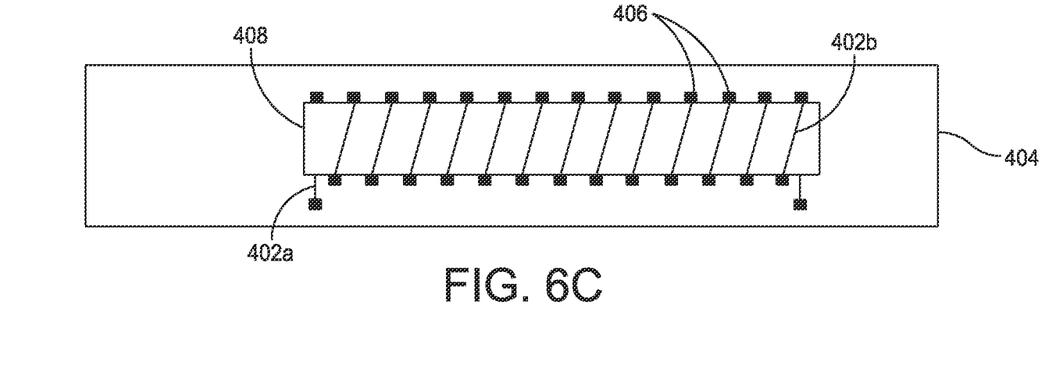
Figure 6D:
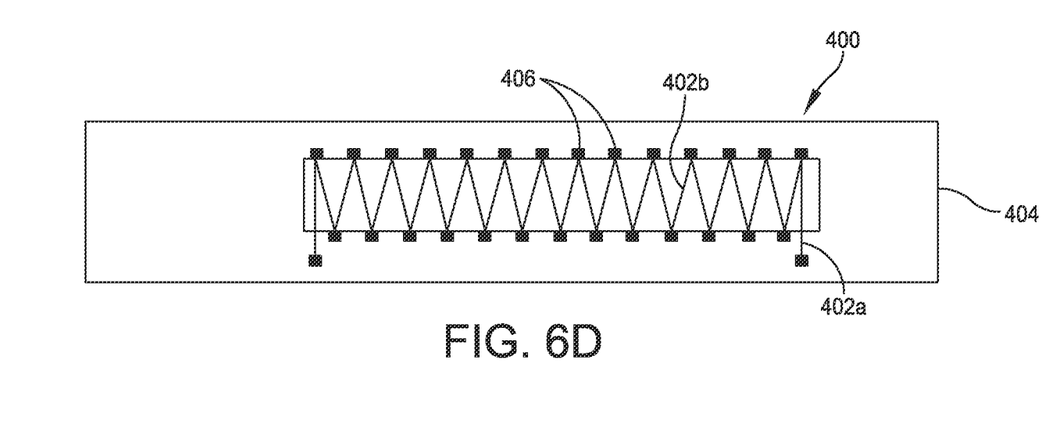

In some embodiments, the inductive coupling circuit 308 comprises one or more inductive coils. The inductive coils may comprise, for example, a wound coil and/or a printed coil. FIGS. 6A-6D illustrate a process of forming a printed inductive coil 400. As shown in FIG. 6A, a bottom coil layer 402a is printed on a substrate 404. The bottom coil layer 402a comprises any suitable material, such as, for example, copper traces. As shown in FIG. 6B, copper pads 406 and a dielectric core 408 are printed in a second layer. The copper pads 406 are coupled to the bottom coil layer 402a. A top coil layer 402b is printed over the dielectric core 408 and coupled to the copper pads 406, as shown in FIG. 6C. FIG. 6D illustrates the completed printed inductive coil 400. The core 408 is shown transparently for illustration purposes.

Figure 7A:
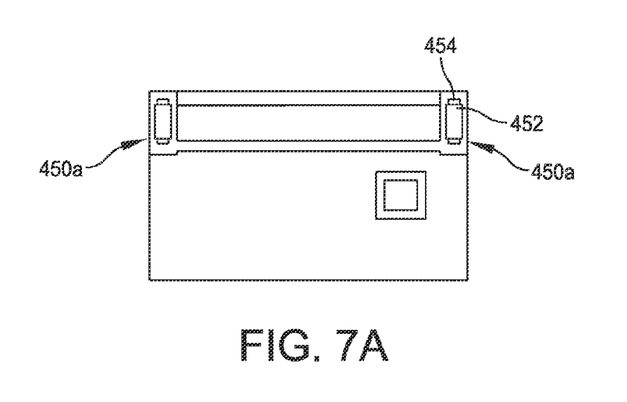
FIGS. 7A and 7B illustrate various embodiments of wound inductive coils.
Figure 7B:
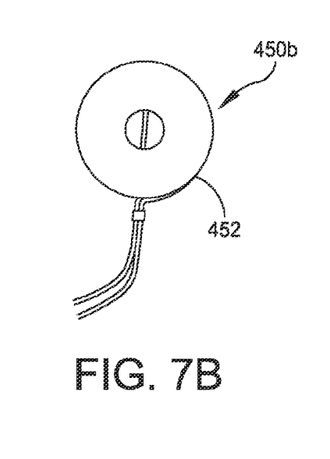

FIGS. 7A and 7B illustrate various embodiments of wound coils that may be suitable for inclusion in the electronic credential core 302. A wound coil is created by a mechanical winding around a conductive core material. The mechanical winding is coupled to a printed circuit board (PCB), such as, for example, the electronic credential core 302. FIG. 7A illustrates a coil 450a comprising a conductive material 452, such as, for example, copper, wound about an insulating core 454. FIG. 7B illustrates a coil 450b comprising a conductive material wound concentrically.

Figure 8:
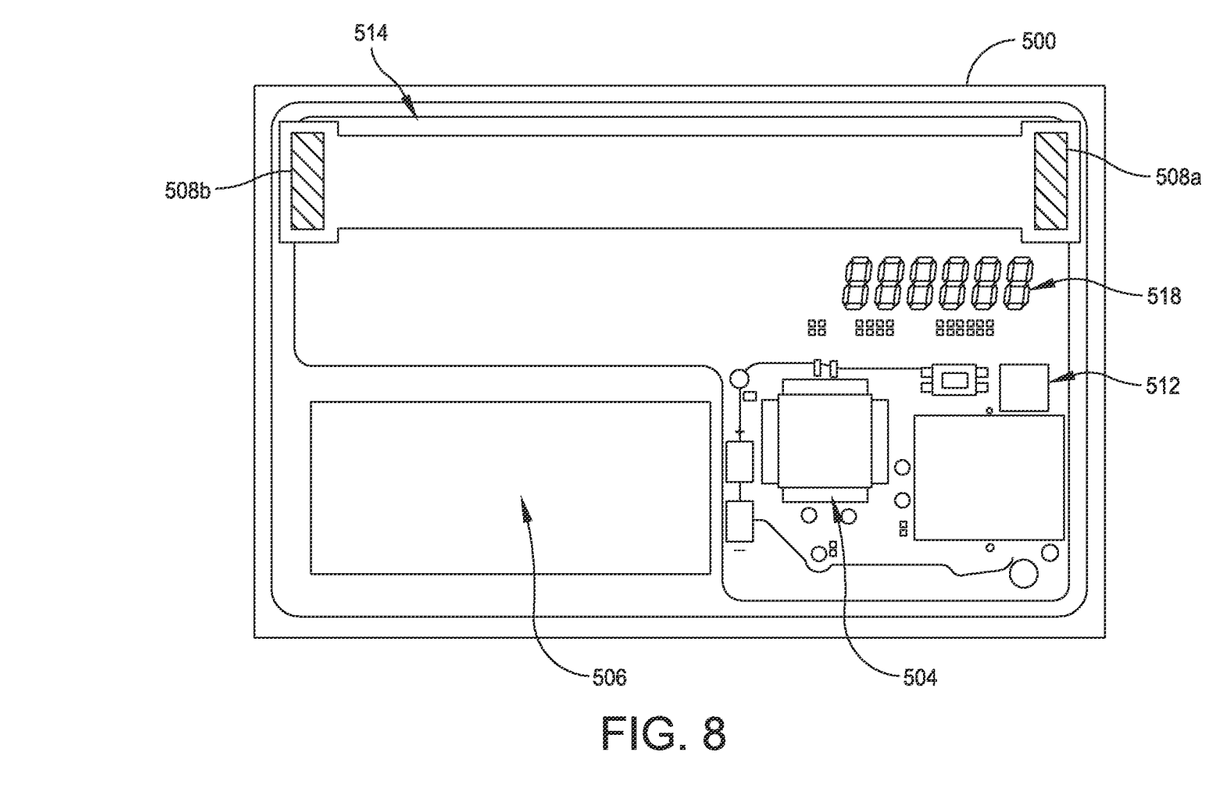
FIG. 8 illustrates one embodiments of an electronic credit card comprising a swipe-activation circuit.

FIG. 8 illustrates one embodiment of an electronic credit card 500 comprising a circuit configured for swipe-activation. The electronic credit card 500 comprises an controller 504 configured to perform one or more predetermined operations when activated. For example, in some embodiments, the controller 504 is configured to generate an OTP and display the OTP to a user. The controller 504 is coupled to a battery 506. The electronic credit card 500 comprises one or more inductive coils 508a, 508b coupled to the controller 504. The inductive coils 508a, 508b are configured to generate a voltage when exposed to an electromagnetic field, such as, for example, a magnetic field generated by a magnetic card reader. In some embodiments, the electronic credit card 500 comprises a magnetic strip (not shown) configured to be read by the magnetic card reader. The first inductive coil 508a may be located at a first end of the magnetic strip and the second inductive coil 508b may be located at a second end of the magnetic strip. When the generated voltage exceeds a predetermined threshold, such as, for example, 0.5V, the controller 504 performs one or more predetermined operations. For example, in some embodiments, when the inductive coils 508a, 508b are passed through a magnetic field, for example, during a read operation of the electronic credit card 500 during a transaction, the inductive coils 508a, 508b generate a voltage, activating the controller 504 to generate an OTP for use in the transaction. In some embodiments, the electronic credit card 500 is configured to display the generated OTP on a 6 digit, 7 segment display 518 formed integrally with the electronic credit card 500. In some embodiments, the electronic credit card comprises a button 516 configured to activate one or more additional functions of the controller 504. The button 516 may be omitted if all functions of the electronic credit card 500 are initiated through conductive coupling.

In some embodiments, the controller 504 maintains a stand-by, or off, mode until activated by the inductive coils 508a, 508b. The controller 504 transitions to an active mode and performs one or more predetermined functions. After performing the one or more predetermined functions, the controller 504 may transition back to a lower power stand-by mode. The one or more predetermined functions may comprise, for example, generating of an OTP and/or illumination of a logo.

In some embodiments, the plurality of inductive coils 508a, 508b are positioned in proximity to a magnetic read strip (not shown) formed on the electronic credit card 500. The inductive coils 508a, 508b comprise manufactured components that fit at each end of the magnetic strip area to receive the magnetic field generated by read heads of a magnetic strip reader, such as, for example, a point of sale device. The inductive coils 508a, 508b comprise a height corresponding to a form factor of the electronic credit card 500. For example, in some embodiments the inductive coils 508a, 508b comprise a height of between 11 mils and 16 mils, and, more particularly, may comprise a height of 12 mils. Those skilled in the art will recognize that form factors other than the electronic credit card 500 may comprise larger or smaller inductive coils 508a, 508b.

In some embodiments, for an OTP card, such as the electronic credit card 500, to generate OTP values, an initial seed value must be provided. The initial seed value may be stored in persistent memory on the electronic credit card 500. In some embodiments, the OTP seed value is replaced each time an OTP is generated. In an event based OTP algorithm, a counter is set for the seed value and is incremented with each generation of an OTP value. In a previous value algorithm, the OTP seed value is set to the previously generated OTP value. In some embodiments, the OTP seed value is provided to the electronic credit card 500 through inductive coupling.

The electronic credit card 500 may comprise persistent memory for storing an OTP seed value and/or an OTP algorithm. An initial and/or current OTP seed value may be transmitted to the persistent memory by, for example, a dual interface microcontroller 512. The dual interface microcontroller 512 may support one or more communication protocols for transmitting and/or receiving an OTP seed value, such as, for example, ISO/IEC 14443 and/or ISO/IEC 7816. The use of, for example, the ISO/IEC 14443 communication protocol allows existing hardware and software systems to be used as seeding stations for the electronic credit card 400. The dual interface microcontroller 512 may comprise any suitable microcontroller, such as, for example, an NXP SmartMx dual interface controller.

In some embodiments, the dual interface microcontroller 512 is coupled to the inductive coils 508a, 508b and/or an antenna 514 to receive an OTP seed value. The dual interface microcontroller 512 temporarily stores an updated seed value in persistent memory formed integrally with the dual interface microcontroller 512. When the controller 504 is activated, either temporarily or permanently, the controller 504 loads the OTP seed value from the dual interface microcontroller 512 and stores the seed value in persistent memory formed integrally with the controller 504. In some embodiments, the dual interface microcontroller 512 is inductively powered by the inductive coils 508a, 508b and is not coupled to the battery 506.

Figure 9:
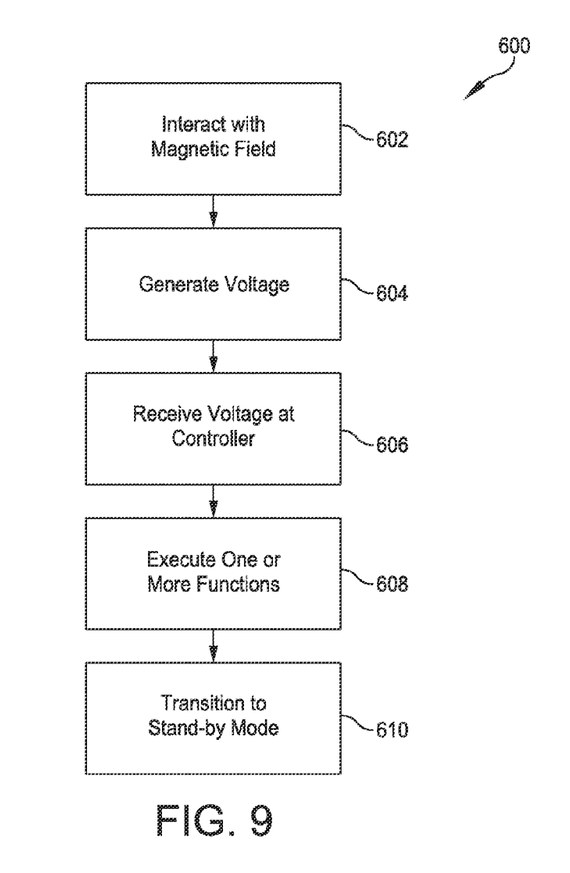
FIG. 9 is a flowchart illustrating one embodiment of a process for swipe-activation of an electronic credit card.

FIG. 9 is a flowchart illustrating one embodiment of a method 600 for swipe-activation of an electronic credential. In a first step 602, an inductive coupling circuit of an electronic credential card is exposed to a changing electromagnetic field. In some embodiments, the change in the electromagnetic field is generated by the movement of the electronic credential card through a magnetic field of a magnetic card reader. In a second step 604, a voltage is generated by the inductive coupling circuit. In a third step 606, the voltage is received by a controller. If the voltage exceeds a predetermined threshold, such as, for example, 0.5V, the method proceeds to a fourth step 608. In the fourth step 608, the controller executes one or more predetermined functions. For example, in some embodiments, the controller generates an OTP code and provides the OTP code to a user and/or a point-of-sale device. In an optional fifth step 610, after performing the one or more predetermined functions, the controller transitions to a stand-by mode until the electronic credit card is exposed to an electromagnetic field sufficient to generate the predetermined voltage.

Embodiments of electronic credentials described herein have a configuration and design that allows the electronic credential to maintain an off, or no-power state, until the electronic credential is exposed to an activation signal. The activation signal causes a controller of the electronic credential to activate and perform one or more predetermined functions. For example, in some embodiments, the electronic credential comprises an antenna configured to receive an RF signal. When the antenna receives the RF signal, a signal interface harvests the energy in the RF signal to generate an activation signal for a controller. The controller is activated by the activation signal and performs one or more functions.

Other embodiments of electronic credentials described herein have a configuration and design that provides for swipe-activation of the electronic credential. The electronic credentials comprise a circuit having a controller and an inductive coupling circuit. The inductive coupling circuit generates a signal when exposed to an electromagnetic field. For example, when the electronic credential is processed by a point-of-sale terminal having a magnetic card reader, the inductive coupling circuit generates a signal in response to the generated magnetic field. The generated signal is provided to the controller. The controller performs one or more functions in response to the generated signal. The inductive coupling circuit allows electronic credentials to be manufactured and used without buttons.

Other embodiments and uses of the systems and methods described herein will be apparent to those skilled in the art from consideration of the specification and practice of the systems and methods described. All documents referenced herein are specifically and entirely incorporated by reference. The specification should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

What is claimed is:

1. A circuit comprising:
    an inductive coupler configured to harvest energy of a first signal from an electromagnetic field and generate a second signal using only energy harvested from the first signal; and
    a controller coupled to the inductive coupler, the controller configured to receive the second signal, and wherein the controller is configured to transition from an off state to an active state to execute one or more predetermined functions when the second signal exceeds a predetermined threshold.

2. The circuit of claim 1, wherein the inductive coupler comprises at least one inductive coil.

3. The circuit of claim 2, wherein the inductive coupler generates a voltage of the second signal proportional to the first signal.

4. The circuit of claim 3, wherein the second signal generated by the inductive coupler is configured to power the controller to execute the one or more predetermined functions.

5. The circuit of claim 2, wherein the inductive coil comprises at least one printed coil.

6. The circuit of claim 1, comprising a battery coupled to the controller, wherein the controller is configured to draw power from the battery to execute the one or more predetermined functions.

7. The circuit of claim 1, wherein the one or more functions include generating a one-time-passcode.

8. The circuit of claim 1, wherein the one or more functions include illuminating a logo.

9. The circuit of claim 1, wherein the inductive coupler is configured to receive one or signals comprising personalization information.

10. The circuit of claim 9, wherein the controller is configured to store received personalization information.

11. The circuit of claim 1, wherein the circuit is contained within a pre-laminate core for use in manufacturing a smart card.

12. A method for swipe activation, the method comprising:
exposing an inductive coupler to an electromagnetic field;
harvesting, by the inductive coupler, a first signal from the electromagnetic field;
generating, by the inductive coupler, a second signal in response to the first signal, wherein the second signal is generated using only energy harvested from the first signal;
providing the second signal to a controller; and
executing, by the controller, one or more predetermined functions when the second signal exceeds a predetermined threshold.

13. The method of claim 12, wherein the inductive coupler comprises at least one inductive coil.

14. The method of claim 12, further comprising powering the controller using a battery.

15. The method of claim 12, further comprising powering the controller using the second signal.

16. The method of claim 12, wherein executing the one or more functions comprises generating, by the processor, a one-time-passcode.

17. The method of claim 12, wherein executing the one or more functions comprises illuminating a logo.

18. The method of claim 12, further comprising:
receiving, by the inductive coupler, personalization information; and
programming the controller with the personalization information.

19. An electronic transaction card, comprising:
a swipe-activated circuit comprising:
one or more inductive coils configured to harvest energy of a first signal from an electromagnetic field;
a signal interface coupled to the one or more inductive coils, the signal interface configured to generate a second signal using only energy harvested from the first signal
a controller coupled to the signal interface, the controller configured to receive the second signal, and wherein the controller executes one or more predetermined functions when the second signal exceeds a predetermined threshold; and
a magnetic strip, wherein the one or more inductive coils are located with respect to the magnetic strip such that the one or more inductive coils are exposed to a magnetic field during a read operation of the magnetic strip.

20. The electronic transaction card of claim 19, further comprising a logo having an illumination source, wherein the controller is configured to illuminate the illumination source in response to the second signal generated by the signal interface.

21. The electronic transaction card of claim 19, further comprising a segment display, wherein the controller is configured to generate a one-time-passcode in response to the second signal, and wherein the controller is configured to display the one-time-passcode on the segment display.

22. The electronic transaction card of claim 19, wherein the one or more inductive coils comprise a first inductive coil and a second inductive coil, wherein the first inductive coil is located at a first end of the magnetic strip and the second inductive coil is located at a second end of the magnetic strip.

* * * * *